(12) United States Patent
Sareena et al.

(10) Patent No.: US 9,696,917 B1
(45) Date of Patent: Jul. 4, 2017

(54) METHOD AND APPARATUS FOR EFFICIENTLY UPDATING DISK GEOMETRY WITH MULTIPATHING SOFTWARE

(71) Applicant: EMC Corporation, Hopkinton, MA (US)

(72) Inventors: Manu R. Sareena, Kannur (IN); Prashant Kulli, Bangalore (IN); Shivasharan Srikanteshwara, Bangalore (IN); Kurumurthy Gokam, Bangalore (IN); Nihar R. Panda, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 268 days.

(21) Appl. No.: 14/319,183

(22) Filed: Jun. 30, 2014

(51) Int. Cl.
*G06F 12/00* (2006.01)
*G06F 3/06* (2006.01)

(52) U.S. Cl.
CPC .......... *G06F 3/0619* (2013.01); *G06F 3/0665* (2013.01); *G06F 3/0689* (2013.01)

(58) Field of Classification Search
CPC .................................................. H04L 67/1097
See application file for complete search history.

(56) References Cited

U.S. PATENT DOCUMENTS

2010/0107161 A1* 4/2010 Nishikawa .......... H04L 67/1097
718/1

* cited by examiner

*Primary Examiner* — Yong Choe
(74) *Attorney, Agent, or Firm* — Krishnendu Gupta (57) ABSTRACT

Example embodiments of the present invention relate to a method, an apparatus, and a computer program product for updating disk geometry in a multipathing environment. The method includes receiving a disk geometry update for a logical unit on a storage array accessible via a multipathing device in the multipathing environment. The method then includes translating the disk geometry update for the logical unit for each respective disk device aggregated by the multipathing device. Requests for the logical unit then may be issued according to the updated geometry.

19 Claims, 6 Drawing Sheets

METHOD AND APPARATUS FOR EFFICIENTLY UPDATING DISK GEOMETRY WITH MULTIPATHING SOFTWARE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

Example embodiments of the present invention relate to a method, an apparatus, and a computer program product for updating disk geometry in a multipathing environment. The method includes receiving a disk geometry update for a logical unit on a storage array accessible via a multipathing device in the multipathing environment. The method then includes translating the disk geometry update for the logical unit for each respective disk device aggregated by the multipathing device. Requests for the logical unit then may be issued according to the updated geometry.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Enterprise storage systems store data in large-scale environments and differ from consumer storage systems in both the size of the environment and the types of technologies that store and manage the data. Storage area networks (SANs) are commonly used in enterprise storage systems to transfer data between computer systems and storage devices. A typical SAN provides a communication infrastructure, including physical connections between computer systems, storage devices, and a management layer that organizes the connections between computer systems and storage devices.

In a SAN environment, computer systems, typically referred to as hosts, connect to the SAN via one or more host bus adapters. In the case of a Fibre Channel SAN, the physical connections between hosts and storage devices may include special Fibre Channel host bus adapters, Fibre Channel switches, Fibre Channel routers, and optical fiber.

Storage devices may include multiple disk drives that combine to form a disk array. A typical disk array includes a disk array controller, a cache, disk enclosures, and a power supply. Examples of disk arrays include the SYMMETRIX Integrated Cache Disk Array System the CLARIION Disk Array System, both available from EMC Corporation of Hopkinton, Mass. A disk array controller is a piece of hardware that provides storage services to computer systems that access the disk array. The disk array controller may attach to a number of disk drives that are located in the disk enclosures. For example, the disk drives may be organized into redundant array of inexpensive disks (RAID) groups for redundancy and efficient performance. RAID is a system that uses multiple disk drives that share or replicate data among the drives. Accordingly, a RAID system can present multiple physical hard drives to a host as a single logical disk drive.

Disk array controllers connect to a SAN via a port. A port serves as an interface between the disk array controller and other devices, such as the hosts, in the SAN. Each disk array controller typically includes two or more ports. Disk array controllers may communicate with other devices using various protocols, such as the SCSI (Small Computer System Interface) command protocol over a Fibre Channel link to the SAN. In the SCSI command protocol, each device (i.e., logical unit (LU)) is assigned a unique numerical identifier, which is referred to as a logical unit number (LUN). Further, communication using the SCSI protocol is said to occur between an "initiator" (e.g., a host bus adapter port) and a "target" (e.g., a storage controller port) via a path (i.e., a storage path). For example, a path may include a host bus adapter port, associated SCSI bus or Fibre Channel cabling, a disk array port, and a LUN. The types of path components in use vary with the storage I/O transport technology in use.

Management of storage paths is provided by path management software. Path management software is a host-based software solution that is used to manage paths and, among other things, can detect load imbalances across paths and buses and can identify alternate paths through which to route data. A multipathing software is a host server based software that is used to read data from and write data to storage arrays via the multiple paths between host server and storage array. In a typical deployment, an application (not shown) running on the host 125 issues I/O requests (e.g., read, write, and control commands) to the storage array 105. The multipathing software selects one of the paths for transmitting each I/O request to the storage array 105. In general, multiple paths are available to provide redundancy and the multipathing software selects the most viable path for each request by considering, for example, load sharing and failover. An example of path management software is EMC® PowerPath® by EMC Corporation of Hopkinton, Mass.

Figure 1:
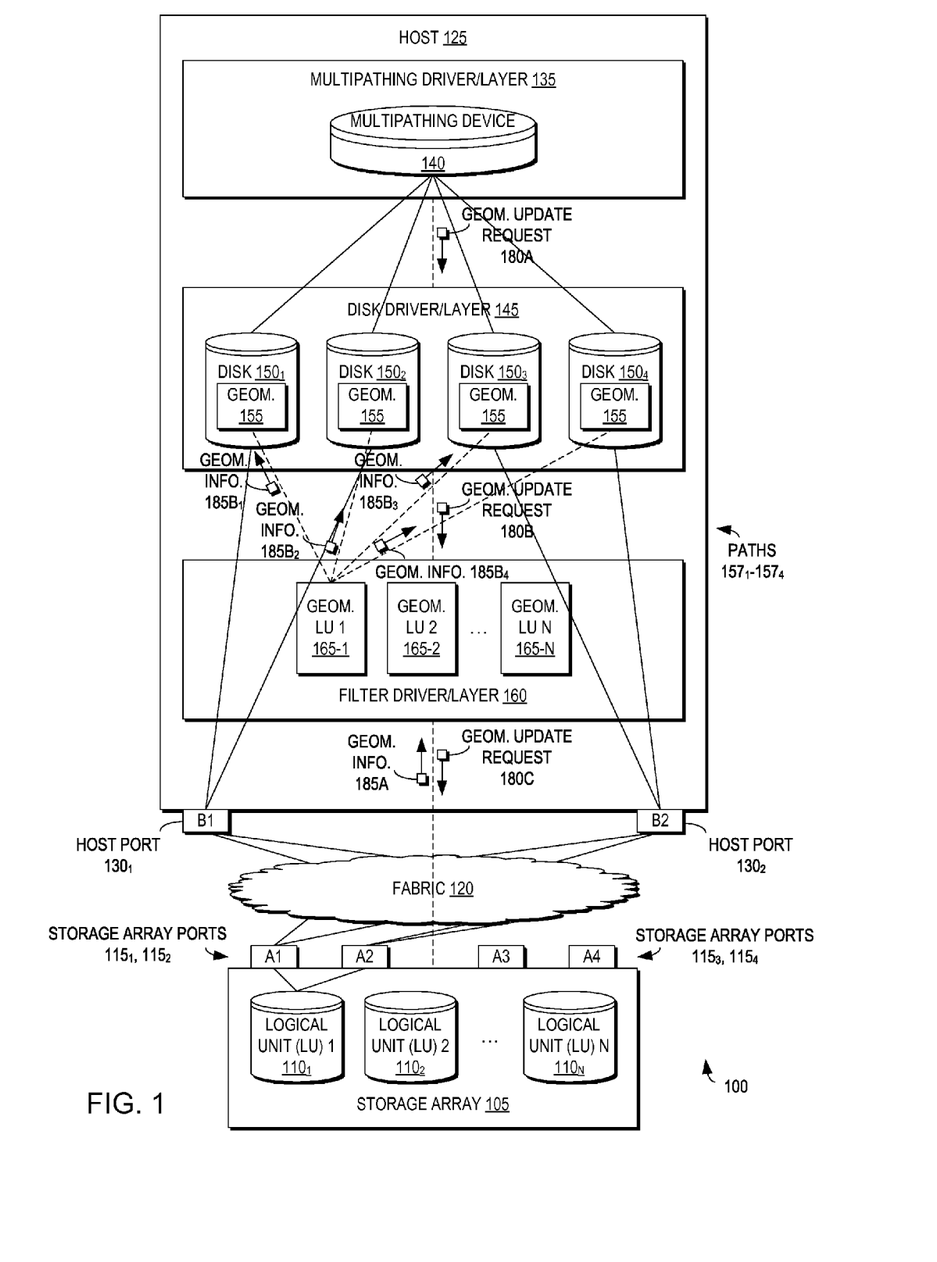
FIG. 1 is a block diagram of a multipathing environment according to an example embodiment of the present invention.

FIG. 1 is a block diagram illustrating a multi-path storage environment (i.e., data center) 100 according to an example embodiment of the present invention. As illustrated in FIG. 1, a storage array 105 may store a plurality of LUs $110_1$-$110_N$ (110 generally) accessible over storage array ports A1-A4 $115_1$-$115_4$ (115 generally). The multipathing environment 100 also includes a host 125 with a plurality of host ports B1, B2 $130_1$, $130_2$.

Such multi-path storage environments 100 typically are deployed with redundancies for enterprise purposes. For example, the multi-path storage environment 100 of FIG. 1 illustrates redundant paths $157_1$-$157_4$ (157 generally) from host (e.g., Host Bus Adapter (HBA)) (i.e., host initiator) port B1 $130_1$ and host port B2 $130_2$ on host 125 over a Storage Area Network (SAN) fabric 120 to LU 1 $110_1$ through ports A1 $115_1$ and A2 $115_2$ of the storage array 105. These redundancies in data centers 100 provide value by preventing data unavailability (DU).

The host 125 may run multipathing software having a plurality of layers, including a multipathing layer 135, a disk layer 145, and a filter driver layer 160. The multipathing layer may provide a multipathing device 140 representing a LU 110 on the storage array 105 and accessible over a plurality of redundant paths 157. In other words, the multipathing layer 135 aggregates each of the paths 157 to the LU 110. The multipathing device 140 in the multipathing layer 135 may be represented in the multipathing software disk layer 145 as a plurality of disks $150_1$-$150_4$ (150 generally) (e.g., SCSI disks), with the disk layer 145 providing a respective disk 150 for each of the paths 157 from the host 125 to the LU 110 on the storage array 105. It should be understood that, in a preferred embodiment, the disk driver layer 145 is not part of a multipathing software but rather is part of the host operating system. For example, an operating system has the disk driver layer when it is installed and for path management support a customer may install EMC PowerPath which inserts itself above the disk driver layer as a third party device driver in the operating system.

The host 125 represents each of the transmission channels to the storage array 105 per logical unit 110 as a unique device with various attributes. One such attribute is disk geometry. Disk geometry includes information pertaining to the structure and layout of the LU 110 and, in certain embodiment, is a factor in correctly locating the address of referenced data for an I/O on the LU 110. Disk geometry may include information relating to number of tracks, cylinders, sectors, and blocks on a disk, as well as disk capacity.

As is understood in the art, a LU 110 may change its geometry, which may not be reflected automatically at host level. For example, the size of the LU 110 in the storage array 105 may be dynamic and may change over time (e.g., expansion, contraction, and partitioning). Whenever the size of the LU 110 is changed on the storage array 105, the disk geometry is changed as well. However, in a preferred embodiment, this change in disk geometry must be explicitly updated by the multipathing software on the host 125 by sending control I/O requests to the storage array 105 for each of the representative device (i.e., disks 150) of the transmission channels. Traditionally, applications open the device 150 with a specific option called delayed-open so that disk driver layer 145 resynchronizes its driver structures to update the disk geometry of LU 110 in the storage array 105.

When a multipathing software is installed on the host 125, it creates an aggregation of the multiple paths 157 to the LU 110 (i.e., the representative disk devices 150 on the host 125). Thus, in certain embodiments, it is the responsibility of the multipathing software to request disk geometry update information for each of the disk devices 150 whenever an open request is issued on the multipathing device 140. In traditional example, the time required for this update is directly proportional to the number of multiple paths 157 to the LU 110 and, therefore, is expensive. Further, it should be understood that no read or write I/O request may be issued to the storage array 105 until the disk geometry is updated on a path. It should be understood that, if the disk geometry information is not updated, the I/O may be directed to an incorrect sector of the LU 110, thereby causing data corruption.

Whenever a LU 110 geometry change operation is performed on the storage array 105, it is critical for the operating system on the host 125, to which the LU 110 is attached, to update its data structures with the new geometry information. This becomes difficult, however, when a multipathing software is installed on the host 125 which must ensure that the multiple paths 157 to the LU 110 receive the same update information. Traditionally, this is a time consuming mechanism depending on the number of available paths 157 to the LU 110 because each of the paths 157 must be marked to request information from the storage array 105 and request the new size update. Traditionally, such operations must be performed during each open of the device 150 and has an adverse impact on the performance of the host 125.

Example embodiments of the present invention overcome these and other disadvantages of traditional multipathing software by providing a filter driver layer 160 below the disk driver layer 145 in the multipathing software. As will be described in greater detail below, the filter driver layer 160 reduces latency involved in updating disk geometry information (i.e., eliminates the latency in updating the same information received on one of the disk devices 150 to the other disk devices 150 which are part of the multipathing device aggregation 140).

Example embodiments of the present invention reduce latency in disk geometry updates, decrease the time lapse in providing I/O load balancing, reduce customer support costs, and improve the performance of applications. In certain embodiments, the latency involved in disk geometry updating is considerably reduced because only one request per LU 110 is issued to the storage array 105; in contrast, existing mechanisms may require as many requests as the number of multiple paths 157 to the storage array 105 per logical unit 110. In other embodiments, the time lapse in providing I/O load balancing due to pending disk geometry updates on multiple paths 157 may be improved as the multiple paths 157 receive the disk geometry information almost simultaneously, thereby improving performance of multipathing software. Further, in yet other embodiments, performance related customer service request costs related to disk geometry updates may be reduced by removing the bottle neck in performing disk geometry update size. Moreover, in certain embodiments, the performance of applications (e.g., volume managers and file systems) which require disk geometry information to be updated may be improved.

Figure 2:
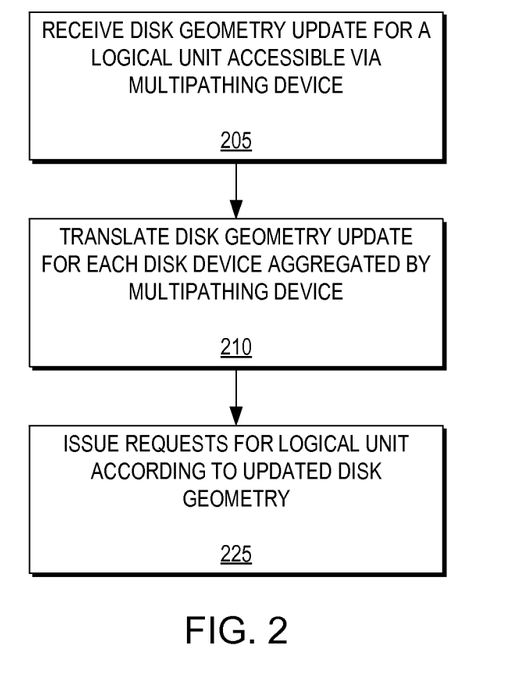
FIGS. 2-4 are flow diagrams of respective methods according to respective example embodiments of the present invention.
Figure 3:
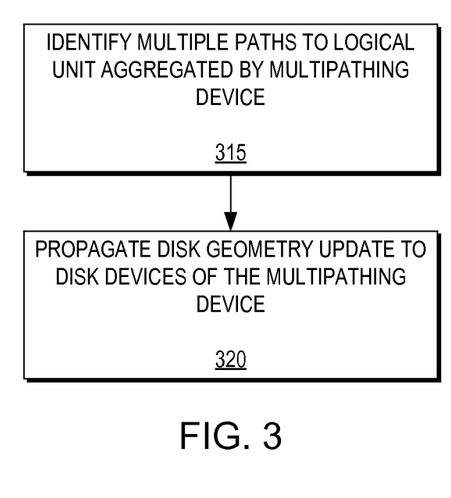
Figure 4:
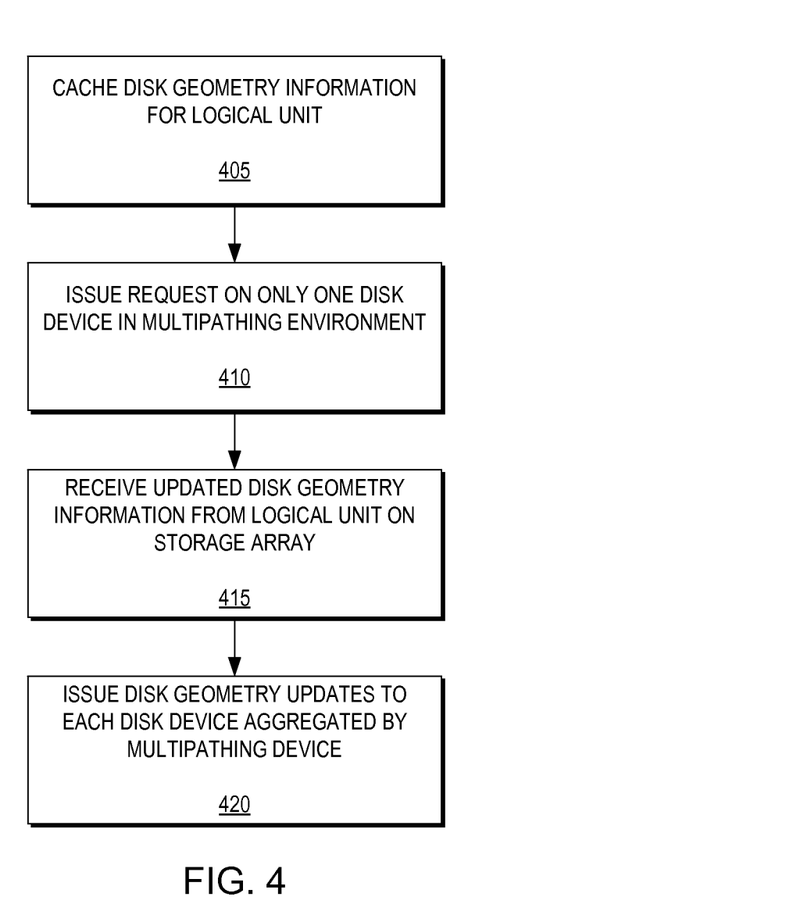

FIGS. 2-4 are flow diagrams of respective methods according to respective example embodiments of the present invention. FIGS. 2-4 may be described in conjunction with FIG. 1.

As illustrated in FIG. 1, when the multipathing device 140 receives an open request from an application, the multipathing device 140 may send a disk geometry update request 180A from the multipathing layer 135 to the disk layer 145. The disk layer 145 then may forward this disk geometry update request 180B toward the storage array 105 to request the LU 110 to provide updated disk geometry information.

Traditionally, each disk 150 (e.g., SCSI disk), mapped to the same LU 110, would maintain a separate in-memory cached copy of the disk geometry information for the LU 110. Traditionally, an open( ) system call on the disk device 150 from the multipathing device 140 with a disk geometry update request (i.e., delayed open) re-syncs the information from LU 110 to the in-memory cached information. In traditional multipathing software, the disk layer 145 would send the disk geometry update request 180B to the LU 110. In other words, each individual disk 150 would send its own request to the LU 110 for disk geometry information, thereby causing a plurality of disk operations on the LU 110.

In example embodiments of the present invention, however, the filter driver layer 160 intercepts the disk geometry update request 180B from the disk layer 145 and forwards the disk geometry update request 180C to the LU 110. In certain embodiments, the filter driver 160 sends single request 180C for all the requests to the LU 110 (i.e., the multipathing layer 135 may broadcast a geometry update request 180A to the disk driver layer 145 (As explained later in the document later a different embodiment may choose not to broadcast) the delayed-open request on all available paths to the LU 110. The filter driver 160, by intercepting these requests, ensures that only one request 180C is sent down to the LU 110 since all the requests will receive the same information thereby avoiding redundant operations. The disk geometry update request 180C may be a request from the disk layer 145 (e.g., a SCSI disk driver) to re-sync in-memory disk geometry information 155 (i.e., cached information) with that on the LU 110 in the storage array 105. The LU 110 then may respond to the request 180C with disk geometry information 185A. The filter driver layer 160 may receive (i.e., intercept) the disk geometry information 185A for the logical unit 110 accessible via the multipathing device 140 (205) and store it as disk geometry information 165-1-165-N (165 generally) for the LU 165. In other words, the filter driver layer 160 may store disk geometry information 165 for each respective LU 110 on the storage array 105.

In certain embodiments, the filter driver layer 160 may store information relating to the multipathing device aggregation (i.e., the disk devices 150 comprising the multipathing device 140 for providing redundant availability of a LU 110) and translate the disk geometry update information 185B for each disk device 150 aggregated by the multipathing device 140 (210). Using this structural information, the filter driver 160 can identify multiple paths 157 to the storage array 105 that are part of single multipathing device 140 (315). In certain embodiments, the filter driver 160 may parse the disk geometry update size requests and translate that to the multipathing device volume before issuing the request to the storage array 105.

As illustrated in FIG. 1, the filter driver layer 160 stores respective disk geometry information entries 165-1-165-N for each of the respective LUs 110 on the storage array 105. The disk geometry information may be stored in memory. The filter driver layer 160 then may send (i.e., broadcast, propagate) the disk geometry information $185B_1$-$185B_4$ (185B generally) to each respective disk device 150 in the disk layer 145 to be stored as disk geometry information 155 for each respective disk device 150 in the disk layer 145 (320). The filter driver layer 160 may use the structural information relating to the multipathing device aggregation.

With the translation information multiple requests 180A through other transmission channels are kept pending at the disk filter driver layer 145 because the information retrieved over any transmission channel for the disk geometry is applicable to all the disk devices 150 aggregated under a multipathing device 140. When disk geometry information 185A is received by the filter driver layer 160 upon the request issued to the storage array 105, all pending requests from the disk devices 150 are provided the information 185B (i.e., disk geometry information $185B_1$ for disk $150_1$ stored as disk geometry information 155, disk geometry information $185B_2$ for disk $150_2$ stored as disk geometry information 155, disk geometry information $185B_3$ for disk $150_3$ stored as disk geometry information 155, and disk geometry information $185B_4$ for disk $150_4$ stored as disk geometry information 155). With the updated disk geometry 155 received for each disk device 150, the host may continue to issue requests (e.g., I/O requests) for the LU 110 according to the updated disk geometry 155 (225).

In other words, as illustrated in FIG. 4, the host 125 may cache disk geometry information 165 for logical units 110 (405), issue a disk geometry update request on only one disk device 150 in the multipathing environment (410), and receive updated disk geometry information 185 from the LU 110 on the storage array 105 (415). The host 125 then may issue disk geometry updates 185 to each respective disk device 150 aggregated by the multipathing device 140 (420). It should be understood that the I/O requests are based on the updated disk geometry information 155 cached in the disk driver layer 145 as a result of the updated disk geometry information 185 being retrieved by the filter driver layer 160. While the filter driver layer 160 does cache the geometry information 165 it is used by the filter driver layer for the purpose of translating that information 165 to the other disks 150 in the disk driver layer 145. Thus I/O requests are issued based on the cached geometry information 155 in the disk driver layer 145 which is received from the cached information 165 in the lower disk filter driver layer 160. Otherwise, the disk driver layer 145 would need to issue geometry update request per disk as in traditional multipathing systems.

In certain embodiments, the filter driver layer 160 may modify the disk geometry information 185 as required for the disk driver structures. In other embodiments, whenever a delayed open request is received at the multipathing device 140, the multipathing layer 135 will not broadcast the open but rather will issue it down on a single path/to a single device. Once the request is completed, the multipathing driver 135 queries the disk driver 145 to fetch the geometry information. This information may be compared with geometry information maintained in the multipathing driver 135.

If there is a geometry change, then a geometry update request 180B is transmitted on other paths aggregated under the multipathing device 140. Because disk geometry changes may be a rare occurrence in a typical data center, this approach provides the advantages applicable to the original approach.

For example, a volume manager application on the host 125 may issue an import command which opens all the available device 150 in the multipathing system to read metadata. This includes the disk devices 150 and the multipathing device 140. Traditionally, this operation would lead to several disk operations, thereby causing a delay. For example, if there are sixteen paths to the same LU 110 on a storage array 105, a volume manager import command will result in 272 disk operations (i.e., per sixteen disk devices per sixteen paths and one multipathing device). However, in example embodiments of the present invention, the number of disk operations is reduced to seventeen (i.e., per sixteen paths and multipathing device).

Figure 5:
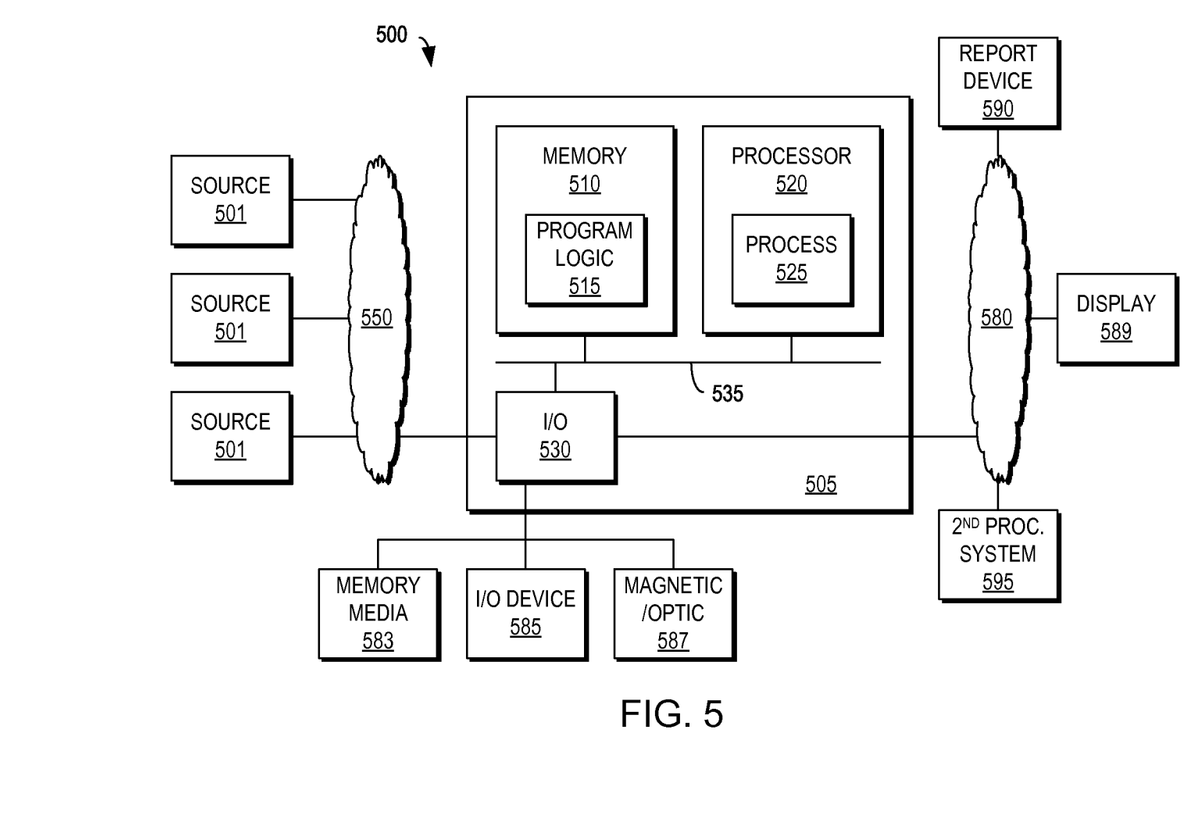
FIG. 5 is a block diagram of an apparatus according to an example embodiment the present invention.

FIG. 5 is a block diagram of an apparatus 505 according to an example embodiment of the present invention. The apparatus 505 may be part of a system 500 and includes memory 510 storing program logic 515, a processor 520 for executing a process 525, and a communications I/O interface 530, connected via a bus 535.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 5, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 6:
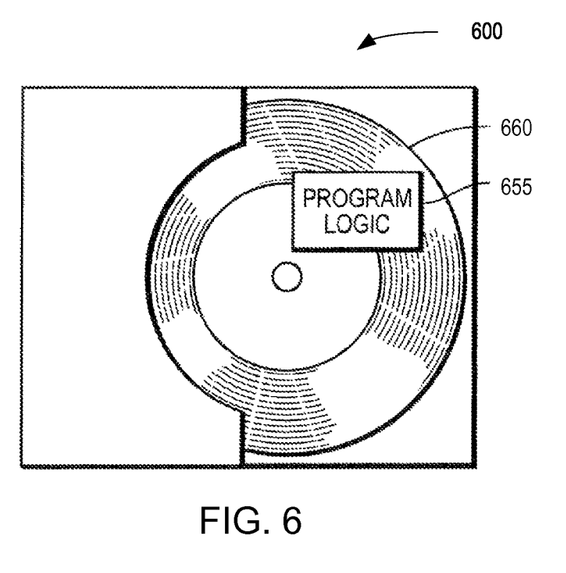
FIG. 6 is a block diagram of a computer program product including program logic, encoded on a computer-readable medium in computer-executable code configured for carrying out the methods of the invention, according to an example embodiment of the present invention.

FIG. 6 is a block diagram of a computer program product 600 including program logic 655, encoded on a computer-readable medium 660 in computer-executable code configured for carrying out the methods of the invention, according to an example embodiment of the present invention. The logic for carrying out the method may be embodied as part of the aforementioned system, which is useful for carrying out a method described with reference to embodiments shown.

For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
   receiving a disk geometry update for a logical unit on a storage array accessible via a multipathing device in a multipathing environment;
   translating the disk geometry update for the logical unit for each respective disk device aggregated by the multipathing device by updating the disk geometry for the logical unit in a multipathing driver of a host in the multipathing environment; and
   issuing requests for the logical unit according to the updated geometry.

2. The method of claim 1 wherein updating the disk geometry for the logical unit in a multipathing driver of a host in the multipathing environment comprises:
   identifying multiple paths to the logical unit aggregated by the multipathing device; and
   propagating the geometry update to the disk devices of the multipathing device to the logical unit.

3. The method of claim 1 wherein the method is performed by a lower disk filter driver below a disk driver layer in the multipathing environment, the method further comprising storing information regarding multipathing device aggregation.

4. The method of claim 3 further comprising caching disk geometry information in the lower disk filter driver per logical unit.

5. The method of claim 4 wherein receiving a disk geometry update for a logical unit accessible via a multipathing device in a multipathing environment comprises re-syncing disk geometry information cached in the lower disk filter driver with disk geometry information of the logical unit on the storage array.

6. The method of claim 1 wherein issuing requests for the logical unit according to the updated geometry comprises:
   determining an address of reference data on the logical unit; and
   issuing requests for the logical unit according to disk geometry information cached in a disk driver layer as a result of updated disk geometry information retrieved by the lower disk filter driver.

7. The method of claim 6
   wherein receiving a disk geometry update for a logical unit on a storage array accessible via a multipathing device in a multipathing environment comprises querying a storage array storing the logical unit for updated disk geometry information;
   wherein issuing requests for the logical unit according to disk geometry information cached by the lower disk filter driver comprises requesting a disk geometry update for a single disk device; and
   wherein translating the disk geometry update for the logical unit for each respective disk device aggregated by the multipathing device comprises propagating the disk geometry update to other disk devices to the same logical unit to avoid further disk operations.

8. The method of claim 1 wherein disk geometry comprises information relating to structure and layout of the logical unit.

9. The method of claim 1 wherein the method is performed by a multipathing driver of a host in the multipathing environment, the method further comprising:
    caching disk geometry information for the logical unit;
    issuing a request on only one disk device;
    receiving updated disk geometry information from the logical unit on the storage array; and
    issuing disk geometry updates to each respective disk device aggregated by the multipathing device.

10. A system comprising:
    memory;
    one or more processors; and
    computer-program code enabled to be executed on the one or more processors that enables the system to perform the operations of:
        receiving a disk geometry update for a logical unit on a storage array accessible via a multipathing device in a multipathing environment;
        translating the disk geometry update for the logical unit for each respective disk device aggregated by the multipathing device by updating the disk geometry for the logical unit in a multipathing driver of a host in the multipathing environment, and
        issuing requests for the logical unit according to the updated geometry.

11. The system of claim 10 wherein computer-program code that enables the system to perform the operation updating the disk geometry for the logical unit in a multipathing driver of a host in the multipathing environment comprises computer-program code that enables the system to perform the operations of:
    identifying multiple paths to the logical unit aggregated by the multipathing device; and
    propagating the geometry update to the disk devices of the multipathing device to the logical unit.

12. The system of claim 10 further comprising computer-program code that enables the system to perform the operation of storing information regarding multipathing device aggregation.

13. The system of claim 12 further comprising computer-program code that enables the system to perform the operation of caching disk geometry information per logical unit.

14. The system of claim 13 wherein computer-program code that enables the system to perform the operation of receiving a disk geometry update for a logical unit accessible via a multipathing device in a multipathing environment comprises computer-program code that enables the system to perform the operation of re-syncing disk geometry information with disk geometry information of the logical unit on the storage array.

15. The system of claim 10 wherein computer-program code that enables the system to perform the operation of issuing requests for the logical unit according to the updated geometry comprises computer-program code that enables the system to perform the operations of:
    determining an address of reference data on the logical unit; and
    issuing requests for the logical unit according to disk geometry information cached in a disk driver layer as a result of updated disk geometry information retrieved by the lower disk filter driver.

16. The system of claim 15
    wherein computer-program code that enables the system to perform the operation of receiving a disk geometry update for a logical unit on a storage array accessible via a multipathing device in a multipathing environment comprises computer-program code that enables the system to perform the operation of querying a storage array storing the logical unit for updated disk geometry information;
    wherein computer-program code that enables the system to perform the operation of issuing requests for the logical unit according to disk geometry information cached by the lower disk filter driver comprises computer-program code that enables the system to perform the operation of requesting a disk geometry update for a single disk device; and
    wherein computer-program code that enables the system to perform the operation of translating the disk geometry update for the logical unit for each respective disk device aggregated by the multipathing device comprises computer-program code that enables the system to perform the operation of propagating the disk geometry update to other disk devices to the same logical unit to avoid further disk operations.

17. The system of claim 10 wherein disk geometry comprises information relating to structure and layout of the logical unit.

18. The system of claim 10 further comprising computer-program code that enables the system to perform the operations of:
    caching disk geometry information for the logical unit;
    issuing a request on only one disk device;
    receiving updated disk geometry information from the logical unit on the storage array; and
    issuing disk geometry updates to each respective disk device aggregated by the multipathing device.

19. A computer program product including a non-transitory computer readable storage medium having computer program code encoded thereon that, when executed on one or more processors of a computer, causes the computer to update disk geometry, the computer program code comprising:
    computer program code for receiving a disk geometry update for a logical unit on a storage array accessible via a multipathing device in a multipathing environment;
    computer program code for translating the disk geometry update for the logical unit for each respective disk device aggregated by the multipathing device by updating the disk geometry for the logical unit in a multipathing driver of a host in the multipathing environment; and
    computer program code for issuing requests for the logical unit according to the updated geometry.

* * * * *